United States Patent [19]

Bell et al.

[11] Patent Number: 5,238,542
[45] Date of Patent: Aug. 24, 1993

[54] PROCESS FOR FORMING METHACRYLAMIDE POLYMER PREPREG COMPOSITE BY ELECTROPOLYMERIZATION

[75] Inventors: James P. Bell, Storrs; Daniel A. Scola, Glastonbury; Jengli Liang, Storrs, all of Conn.

[73] Assignees: The University of Connecticut, Storrs; United Technologies Corporation, Hartford, both of Conn.

[21] Appl. No.: 947,367

[22] Filed: Sep. 18, 1992

Related U.S. Application Data

[63] Continuation of Ser. No. 665,943, Mar. 5, 1991, abandoned.

[51] Int. Cl.⁵ .............................. C25B 3/00
[52] U.S. Cl. .................... 204/72; 204/59 R; 523/215
[58] Field of Search ............ 204/72, 59 R; 523/215

[56] References Cited

U.S. PATENT DOCUMENTS

| | | |
|---|---|---|
| 4,272,346 | 6/1981 | Jakubowski et al. ............ 204/181.4 |
| 4,952,654 | 8/1980 | Bueschl et al. ............ 526/307.7 |

OTHER PUBLICATIONS

Electropolymerization of Methyl Methacrylate on Carbon Fiber Surfaces, J. R. MacCallum & D. H. MacKerron.
Water-Insoluble Polyacrylamide, I.
Imidization Reaction in Polyvinylamides.
The Electropolymerization of Acrylamide on Carbon Fibres.
Subramanian et al, "Electropolymerization on Graphite Fibers", Polymer & Eng. Science, vol. 18, No. 7, May 1978, pp. 590–600.
Ergozhin et al., "Water Soluble Polyelectrolytes Based on Methacryloylaminobenzoic Acids", Makromol. Chem., Rapid Commun. 8, No. 4, Apr. 1987, pp. 171–177.

*Primary Examiner*—John Niebling
*Assistant Examiner*—Kishor Mayekar
*Attorney, Agent, or Firm*—Fishman, Dionne & Cantor

[57] ABSTRACT

Cyclic (and preferably aromatic) N-substituted methacrylamide monomers are electropolymerized onto electrically conductive (e.g., graphite) filler (e.g., fibers, plates, film or cloth) to form a novel polymer composite exhibiting high Tg as well as a controlled degree of cross-linking which can prevent flow at high temperature.

12 Claims, 3 Drawing Sheets

PROCESS FOR FORMING METHACRYLAMIDE POLYMER PREPREG COMPOSITE BY ELECTROPOLYMERIZATION

This is a continuation of copending application Ser. No. 07/665,943 filed Mar. 5, 1991, now abandoned.

BACKGROUND OF THE INVENTION

This invention relates to a method of forming methacrylamide polymer composites using electro-polymerization techniques. More particularly, this invention relates to the formation of high glass transition temperature polymer coatings onto the surface of conductive filler materials (such as graphite fibers) wherein the polymer is derived from cyclic N-substituted methacrylamide monomers. This invention provides an electropolymerized polymer composite which is processible as a thermoplastic, but undergoes a crosslinking step upon heat curing so as to exhibit thermoset properties such as high strength, high glass transition and high resistance to flow and solvents.

High performance resins with a good long term environmental stability over a wide range of temperature and with damage tolerance are currently in great demand, particularly in aerospace applications. These resins are typically needed in the manufacture of composite materials which require the properties of high strength and low weight. Thermosetting resins such as epoxy systems are the most widely used matrix resins for such advanced composites. Unfortunately, they generally possess insufficient hot/wet properties, toughness and temperature resistance. An exception to this generality is bismaleimide polymers since they are stable at elevated temperature (approximately 200° C.) and have good hot/wet properties. The problem with such systems is that the processing times are relatively long and there is no resin flow after the cure reaction is completed. Greater toughness and impact resistance are also highly desirable.

These problems have heightened the search for alternative thermoplastic materials for use as matrices for advanced composites Advantageous features of thermoplastic matrices include high toughness, easy processibility, long shelf life and potential for high volume processing resulting in low cost per part. However, the difficulty in preparation of prepregs from high viscosity thermoplastic resins and the problem of wetting all the individual fibers in a fiber bundle as well as the problem associated with polymer solubility and solvent removal limit the efficiency of use of thermoplastics in advanced composites.

Electropolymerization has been used in the direct formation of polymers onto electrode surfaces such as graphite fibers. Such polymerizations have generally been from non-aqueous solutions, by ionic or mixed ionic-radical mechanism. However, molecular weights of the electropolymers from these solutions have generally been low.

More recently, aqueous solution electropolymerization techniques have been disclosed to apply thin (less than ten (10) weight % polymer) polymeric coating onto graphite fibers. See Bell et al, *Polymer Composites*, 8,46 (1987), Subramanian et al, *Polymer Engr. Sci.*, 18,590 (1978). Unfortunately, such thin deposition of thermoplastic polymers onto graphite fibers does not satisfy the need for new thermoplastic composite materials since the thin coatings are incapable of forming the required thick thermoplastic matrix needed in such composites.

An improved electropolymerization method and composite product derived therefrom is disclosed in U.S. patent application Ser. No. 366,933 filed Jun. 16, 1989, assigned to the assignee hereof and fully incorporated herein by reference. In accordance with the technique of U.S. Ser. No. 366,933, electropolymerization in a substantially aqueous solution is used to form thick (e.g. greater than 2 microns or 30 weight %) and thermally stable coatings of thermoplastic materials onto electrically conductive materials (e.g. rods, plates, fibers, film or cloth). In a preferred embodiment, the thick thermoplastic matrix comprises a copolymer of 3-carboxyphenyl maleimide (3-CMI) and styrene. Also disclosed are thermoplastic matrices comprised of glycidyl acrylate/methyl acrylate copolymer as well as certain other thermoplastic polymers and copolymers.

The technique of U.S. Ser. No. 366,933 is particularly well suited for direct preparation of thermoplastic prepregs containing commercially available bundles of graphite fibers. These prepregs are then molded under heat and pressure so as to form a thermoplastic matrix composite with good fiber distribution, uniformity and high temperature resistance.

In view of the favorable results and advantages of the above-discussed electropolymerization technique, there is a perceived need for additional development of electropolymerized thermoplastic polymer composites exhibiting good mechanical and thermal properties.

Experimental work is known with regard to the electropolymerization of acrylamide monomers (see M. Cvetkovskaja, T. Grcev, L. Arsov and G. Petrov, Kem. Ind. 34, 235 (1985) and J. R. MacCallum and D. H. MacKerron, *The Electropolymerization of Acrylamide on Carbon Fibres*, British Polymer Journal, Vol. 14, March 1982, pp. 14–18). However, the electropolymerized polyacrylamide composites described in the prior literature suffer from certain disadvantages and deficiencies including high water absorption, low temperature resistance, high solubility rates in water and thin polyacrylamide coatings on fillers such as graphite fibers.

SUMMARY OF THE INVENTION

The above-discussed and other problems and deficiencies of the prior art are overcome or alleviated by the novel electropolymerized cyclic N-substituted methacrylamide derivative polymer composites of this invention. In accordance with the present invention, cyclic (and preferably aromatic) N-substituted methacrylamide monomers are electropolymerized onto electrically conductive (e.g., graphite) filler (e.g., fibers or plates) to form a novel polymer composite exhibiting high Tg as well as a controlled degree of cross-linking which can prevent flow at high temperature. This latter feature of this invention (e.g., controlled cross-linking) provides particularly important advantages to this invention in that the initially formed polymer will behave and be processable as a thermoplastic and so may be termed a polymeric composite prepreg. Thereafter, however, the composite may go through a post cure (or post fabrication) stage where a crosslinking reaction takes place in the polymer matrix. This crosslinking will increase with each heating and cooling cycle so that the resultant composite will behave as a thermoset with a controlled degree of crosslinking (dependent in part on the number of heating/cooling cycles). Thus, the polymer composite of this invention includes the benefits of both thermosetting and thermoplastic systems obtained by controlling the degree of crosslinking.

The monomers used in the composite of this invention may comprise one or more cyclic N-substituted methacrylamide monomers. In addition, the polymer may include other monomers such as methyl methacrylate derivatives for tailoring the composite properties (e.g., water absorption or enhancing the rate of polymerization).

It will be appreciated that the crosslinking and imide formation reactions associated with this invention were not possible in the simple acrylamide compositions of the prior art such as described in the MacCallum and MacKerron article cited above.

The above-discussed and other features and advantages of the Present invention will be appreciated and understood by those skilled in the art from the following detailed description and drawings.

BRIEF DESCRIPTION OF THE DRAWINGS

Referring now the drawings, wherein like elements are numbered alike in the several FIGURES.

DESCRIPTION OF THE PREFERRED EMBODIMENT

The present invention relates to a polymer matrix composite wherein the polymer matrix includes at least one cyclic N-substituted methacrylamide derivative monomer electropolymerized and fused onto electrically conductive filler material. The monomer for use in the present invention has the formula:

where R results in the molecule being a cyclic N-substituted methacrylamide derivative such as phenylmethacrylamide, 2-carboxyphenylmethacrylamide and 4-carboxyphenylmethacrylamide (with the structures being shown in TABLE 3). Additional cyclic N-substituted methacrylamide derivatives suitable for this invention are identified in TABLE 1. Preferably, R is an aromatic constituent and more preferably includes a phenyl group. The present invention may comprise a homopolymer or a copolymer and may include other comonomers in addition to N-substituted methacrylamide monomers. Preferred comonomers include bulky constituent groups such as methyl methacrylate and its derivatives which provide spacing for the N-substituted methacrylamide monomers. Preferred examples of such methyl methacrylate derivative comonomers are set forth in TABLE 2.

Examples of polymers successfully synthesized using the electropolymerization technique of this invention are set forth in TABLE 3. In general, the polymer of this invention has the formula:

where M and N are typically on the order of 40 to 1000 (and preferably 300 to 600).

As mentioned, the cyclic N-substituted methacrylamide derivative monomers are electropolymerized onto any suitable electrically conductive material including but not limited to

TABLE 1

CYCLIC N-SUBSTITUTED METHACRYLAMIDE DERIVATIVES

| COMPOUND NUMBER | CHEMICAL STRUCTURE | CHEMICAL NAME |
|---|---|---|
| 1 | —NH—⟨phenyl⟩—CH$_2$COOH | N-Methacryloyl-p-aminophenylacetic acid |
| 2 | —NH—⟨phenyl with HOOC, COOH⟩ | N-methacryloyl-3-aminophthalic acid |

TABLE 1-continued

CYCLIC N-SUBSTITUTED METHACRYLAMIDE DERIVATIVES

| COMPOUND NUMBER | CHEMICAL STRUCTURE | CHEMICAL NAME |
|---|---|---|
| 3 | (benzene ring with —NH— at position 1, COOH at positions 3 and 5) | N-methacryloyl-5-aminophthalic acid |
| 4 | —NH—CHCOOH with phenyl substituent | N-methacryloyl-DL-2-phenyl glycine |
| 5 | —NH—CHCOOH with CH$_2$-phenyl substituent | N-methacryloyl-DL-phenylalanine |
| 6 | —NH—CHCH$_2$COOH with phenyl substituent | N-methacryloyl-DL-3-amino-3-phenyl propionic acid |
| 7 | benzene with —N(CH$_3$)— and ortho-COOH | N-methacryloyl-N-methyl anthranilic acid |
| 8 | benzene with —N(phenyl)— and ortho-COOH | N-methacryloyl-N-phenyl anthranilic acid |
| 9 | —N(phenyl)—CH$_2$COOH | N-methacryloyl-N-phenyl glycine |
| 10 | benzene with —NH— at 1, COOH at 3, OH at 4 | N-Methacryloyl 4-aminosalicylic acid |
| 11 | benzene with —NH— at 1, COOH at 4, OH at 3 | N-Methacryloyl 4-aminosalicylic acid |
| 12 | benzene with —NH— and para-OH | N-(4-hydroxyphenyl)methacrylamide |

TABLE 1-continued

CYCLIC N-SUBSTITUTED METHACRYLAMIDE DERIVATIVES

| COMPOUND NUMBER | CHEMICAL STRUCTURE | CHEMICAL NAME |
|---|---|---|
| 13 | (adamantanyl-NH-) | N-adamantanyl-methacrylamide |
| 14 | (-NH-CH$_2$-phthalimide) | N-phthalimidemethyl-methacrylamide |
| 15 | (-NH-C(phenyl)$_3$) | N-triphenylmethyl methacrylamide |

TABLE 2

METHYL METHACRYLATE DERIVATIVES

| COMPOUND NUMBER | CHEMICAL STRUCTURE | CHEMICAL NAME |
|---|---|---|
| 1 | -O-cyclohexyl | cyclohexyl methacrylate |
| 2 | -O-isobornyl | isobornyl methacrylate |
| 3 | -O-C$_6$H$_4$-COOH | methacryloylbenzoic acid |
| 4 | -O-C$_6$H$_4$-O-C(=O)-C$_6$H$_4$-O-C$_6$H$_{13}$ | 4-(p-hexyloxybenzoyloxy)phenyl methacrylate |
| 5 | -O-C$_6$H$_4$-C$_6$H$_5$ | 4-biphenyl methacrylate |

TABLE 3
ELECTROPOLYMERIZED POLYMER SYSTEMS IN ACCORDANCE WITH THIS INVENTION graphite or metal plates, rods, fibers, particles, film, metal or graphite coated fibers or woven or non-woven conductive webs.

The electropolymerization processing technique used to form the polymer composites of this invention is essentially the same as the electropolymerization methodology disclosed in U.S. Ser. No. 366,933 (which has been incorporated herein by reference). Accordingly, reference should be made to that earlier filed application and particularly the electrochemical processing cell of FIG. 1 of U.S. Ser. No. 366,933.

The present invention will now be more particularly described with respect to the following non-limiting examples.

EXPERIMENTAL 2- and 4-carboxyphenylmethacrylamide (2-CPM and 4-CPM) were synthesized by condensation of methacryloyl chloride (from Monomer & Polymer Lab, Inc.) with 2- or 4-aminobenzoic acid (from Aldrich Chemical Co.) following a procedure published by Kishore Patel, Trushar Desai and Bhikhu Sutar., Makromol. Chem. 186, 1151-1156 (1985). The melting point was 177° C. for 2-CPM and 227° for 4-CPM. Phenylmethacrylamide (PM) and phenylmaleimide (PMI) (from Monomer & Polymer Lab, Inc.) were used as received. Methyl methacrylate (MMA) was distilled under reduced pressure and kept cold.

Electropolymerization was done as described in U.S. Ser. No. 366,933: AS-4 graphite fiber bundle (from Hercules, Inc.) was wound onto an aluminum H-frame and was put into a central chamber of a three compartment cell. This central chamber contains monomer and sulfuric acid electrolyte dissolved in dimethylacetamide and water solution. The reaction was controlled by passing a constant current of 30 mA per gram of fiber using the graphite fiber as cathode and metal anode (titanium oxide coated with indium oxide). Electropolymerization time varied from 20 mins to 7 hours until a weight gain of 35% (67% fiber volume fraction) was attained. The weight gain on graphite fibers was obtained by weighing the sample after drying for two hours at 250° C. in vacuum. Unidirectional composites with 24 plies were fabricated from dried prepregs by compression molding at 280° C. and pressure of 5.6 kg/cm² for 1.5 hours.

CHARACTERIZATION

The glass transition temperatures (Tg's) of composites were obtained by the Dynamic Mechanical Analysis (DMA) using the Polymer Lab DMTA at 1 Hz and heating rate of 5° C./min. Thermal stability was characterized by Perkin-Elmer TGA at a heating rate of 40° C./min under a nitrogen environment. NMR spectra of the CPM/MMA copolymers were taken in DMSO-$d_6$ solution on a Bruker AC-270 spectrometer operating at 270 MHz. Tetramethylsilane (TMS) was used as an internal standard. The CPM/MMA copolymer composition of each sample was also calculated from NMR spectroscopy by following a procedure published by A. F. Shaaban, A. A. Khalil, J. Applied Polymer Science, Vol. 37, 2051-2058 (1989). The apparent interlaminar shear strength of these unidirectional composites were determined by the short beam method ASTM 2344, with a span to depth ratio 4/1. The notched Izod impact resistance was tested by ASTM 256.

The thermal treatment of each NaCl rectangular disk (8 mm×8 mm) coated with polymer thin film for IR study was done by putting the disk into a DuPont DSC cell, under controlled temperature and nitrogen environment, for a presetting time. The reaction conversion or the percentage of amide II consumption was calculated using the equation:

$$\text{amide reacted (\%)} = \frac{\frac{A(1)}{A(2)}(t=0) - \frac{A(1)}{A(2)}}{\frac{A(1)}{A(2)}} \times 100\%$$

$A(1)$ = absorbance of amide II peak at 1505-1524 cm$^{-1}$
$A(2)$ = absorbance of aromatic reference at 1605 cm$^{-1}$ The gel fraction of the cured polymer was estimated by weighing after extraction by dimethylacetamide for 24 hrs in a Soxhlet extractor.

RESULTS

The chemical structures of electropolymerized N-substituted methacrylamide matrices which have been successfully deposited onto graphite fiber are shown in TABLE 3. Though all of them have bulky, stiff groups in each repeat unit, data from TABLE 4 shows that polymer weight gain and Tg are highly dependent on type of monomer or comonomer used. Due to the stiff side chain and considerable degree of hydrogen bonding between the amide and acid groups along the polymer chain, all of the polymers have Tg's above 200° C. A comparison of the selected reaction time and weight gain data (TABLE 4) shows that only the 2-carboxyphenylmethacrylamide/methylmethacrylate (2-CPM/MMA) and 4-carboxyphenylmetharylamide/methylmethacrylate (4-CPM/MMA) copolymers were deposited at a high rate of polymerization. The criterion of obtaining a thick coating on graphite fiber is to require not only that the monomer polymerize rapidly but also require that the polymer formed on graphite fiber to swell sufficiently to allow monomer to diffuse easily through. In this way, the polymer coating can grow thicker in a short time. This may be the reason for the observed high rate of weight gain for 2-CPM and 4-CMP/MMA.

TABLE 4

| MONOMER | REACTION CONDITION | | | | |
|---|---|---|---|---|---|
| | MONOMER CONC. (MOLE/l) | CURRENT DENSITY Ma/G FIBER | REACTION TIME (Hr) | WT. GAIN$^a$ (%) | Tg (°C.) |
| PM/PMI | 0.5 | 30 | 9 | 40 | 220$^b$ |
| 2-CPM | 0.5 | 30 | 7 | 40 | 250$^c$ |
| 4-CPM | 0.5 | 30 | 7 | 45 | 300$^c$ |
| 2-CPM/MMA | 0.5 | 30 | 0.5 | 35 | 210$^b$ |
| 4-CPM/MMA | 0.5 | 30 | 0.5 | 40 | 240$^b$ |

$^a$35% weight gain approx. 67% fiber volume fraction calculated by using density of 1.8 g/cm$^3$ for fibers and density of 1.18 g/cm for matrices
$^b$Tg depends on polymer composition:
0.45 mole fraction of PM in PM/MI copolymer (Tg approx. 220° C.)
0.5 mole fraction of 2-CPM in 2-CPM/MMA copolymer (Tg approx. 210° C.)
0.49 mole fraction of 4-CPM in 4-CPM/MMA copolymer (Tg approx. 240° C.)
$^c$These values were attained after reheating the sample in DMTA Because of the ease of electropolymerization and high Tg, the CPM/MMA system was fabricated into composites. The properties are discussed below.

Examination of TGA curves of all these polymer samples indicate that there is a large weight loss around 400° C. indicative of its moderate thermal stability. The TGA data reveal that 4-CPM homopolymer shows a higher stability than 2-CPM homopolymer, the trend of thermal stability being 4-CPM>2-CPM>4-CMP/MMA>2-CPM/MMA=PMMA.

Figure 1:
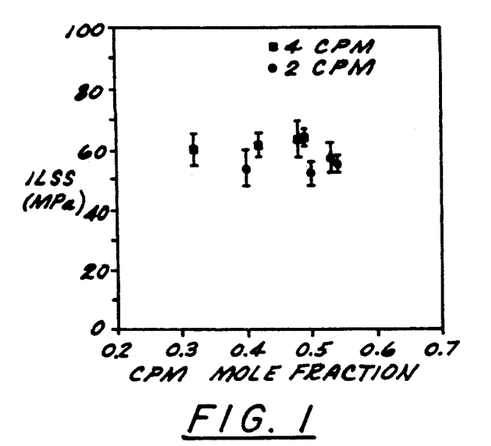
FIG. 1 is a graph of interlaminar shear strength of composites in accordance with the present invention vs. matrix composition.
Figure 2:
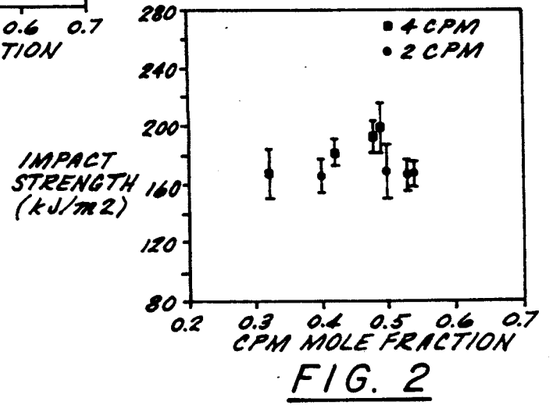
FIG. 2 is a graph of impact strength of composites in accordance with the present invention vs. matrix composition.

FIG. 1 shows the interlaminar shear strength (ILSS) of 2-CPM/MMA and 4-CPM/MMA graphite composite as a function of polymer composition. As shown in FIG. 1, the ILSS of 2-CPM/MMA is slightly lower than for the 4-CPM/MMA (50 MPa as compared to 60 MPa for 4-CPM/MMA). This behaviour is possible due to a larger amount of intermolecular hydrogen bonding of 4-CPM/MMA. Within the selected composition range, the ILSS of both systems level out and do not change very much. The notched Izod impact strength data are displayed in FIG. 2. The impact strength of 4-CPM/MMA composites shows a slight increase over 2-CPM/MMA composites at the same composition; for example 200 KJ/m$^2$ vs 170 KJ/m$^2$ for $F_1=0.5$. During the test, the delamination failure modes of both 4-CPM/MMA and 2-CPM/MMA specimens were observed. All of the samples show a failure mode which was indicative of notch insensitivity. The short beam shear and impact strength measurements of FIGS. 1 and 2 indicate appreciably high impact strengths, approximately 180 KJ/m$^2$ for 4-CPM/MMA composite and 165 KJ/m$^2$ for 2-CPM/MMA composite. These values are significantly higher than 100 KJ/m$^2$ for a typical epoxy composite at 67% fiber volume fraction. The interlaminar shear strengths were both approximately 60 MPa (which is slightly lower than 80 MPa for typical epoxy composite at 67% fiber volume fraction).

Figure 3:
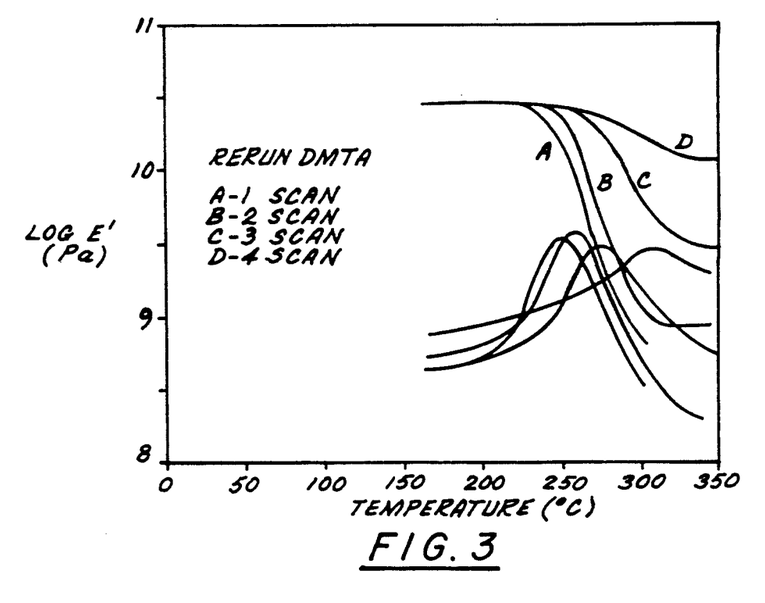
FIG. 3 is a dynamic mechanical analysis of 4-CPM composite in accordance with the present invention.
Figure 4A:
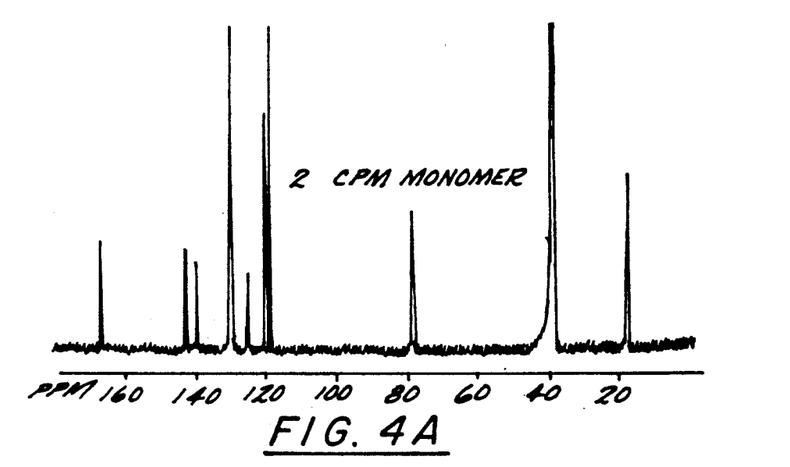
FIGS. 4A–D are NMR spectra for 2-CPM monomer, 2-CPM polymer, 2-CPM polymer heated at 250° C. for 60 minutes and diacetamide, respectively.
Figure 4B:
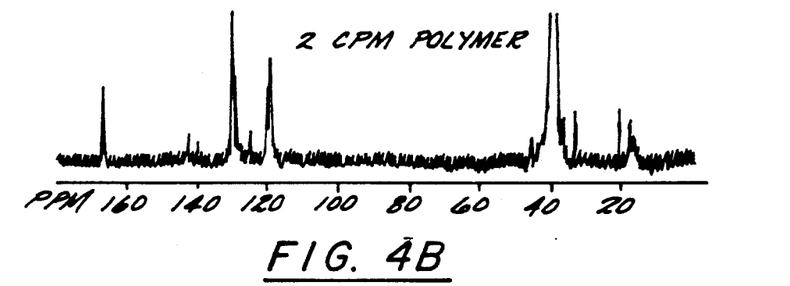
Figure 4C:
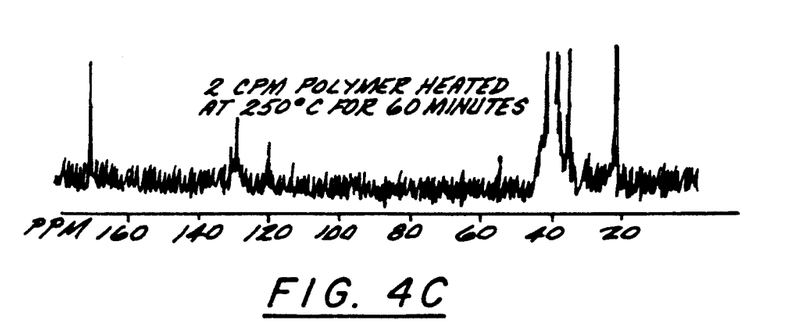
Figure 4D:
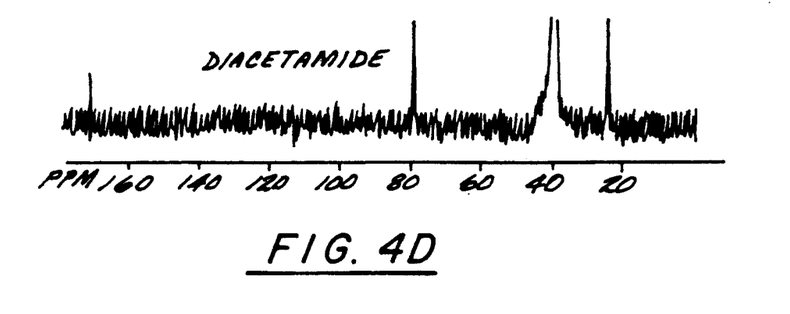

With reference now to FIG. 3, the Tg and storage Modulus at the rubbery plateau of the poly (4-carboxyphenylmethacrylamide) composite were both increased significantly after successively reheating to 350° C. in the DMTA cell. The same trend was also shown by the poly (2-carboxyphenylmethacrylamide) composite upon heating. For the latter, the change in the Tg and storage Modulus at the rubbery plateau is small after the first cycle. Supplemental result from reheating 2- and 4-CPM polymers in the DSC cell show the same characteristic trend as the DMTA data. Both of the DSC thermographs show an endothermic peak on the first scan. The thermal reaction between —CONH and —COOH groups is confirmed by NMR spectra (FIG. 4A–D). The carbonyl peaks of —CONH and COOH before curing are at 166 and 167 ppm, respectively (FIGS. 4A and 4B). Instead the carbonyl peak of the imide after heating at 250° C. for one hour is at 170 ppm, which is close to the 171 ppm for the imide peak of a diacetamide model compound (FIG. 4C and 4D).

Infrared spectra also support the reaction of carboxyl and amide groups to form imides. This is discussed first with regard to the monomer followed by a discussion of the polymer. It is shown that IR spectra of thermally treated 2-CPM monomer exhibits the 1760 cm$^{-1}$ and 1730 cm$^{-1}$ band, the former being lower in intensity. These two bands are not seen in the IR spectra of unheated 2-CPM monomer. The intensity of amide II at 1524 cm$^{-1}$ is also lower after heating. This is consistent with a thermal reaction between —CONH and —COOH groups. Obviously, the double bond of 2-CPM monomer will also start to polymerize and form 2-CPM polymer. That is why the IR spectra of thermally treated 2-CPM monomer is identical to that of thermally treated 2-CPM polymer.

Again, the 1760 cm$^{-1}$ and 1730 cm$^{-1}$ bands of thermal treated 2-CPM polymer are not shown in the IR spectra of 2-CPM polymer. By comparing the IR spectra of diacetamide, 2-CPM polymer and thermally treated 2-CPM polymer, the absorption peak at 1605 cm$^{-1}$ appears to be the aromatic carbon-carbon stretching vibration and the absorption near 1524 cm$^{-1}$ appears to be amide II. The ratio of these two bands will be used to determine the extent of thermal reaction between —CONH and —COOH groups.

Figure 5:
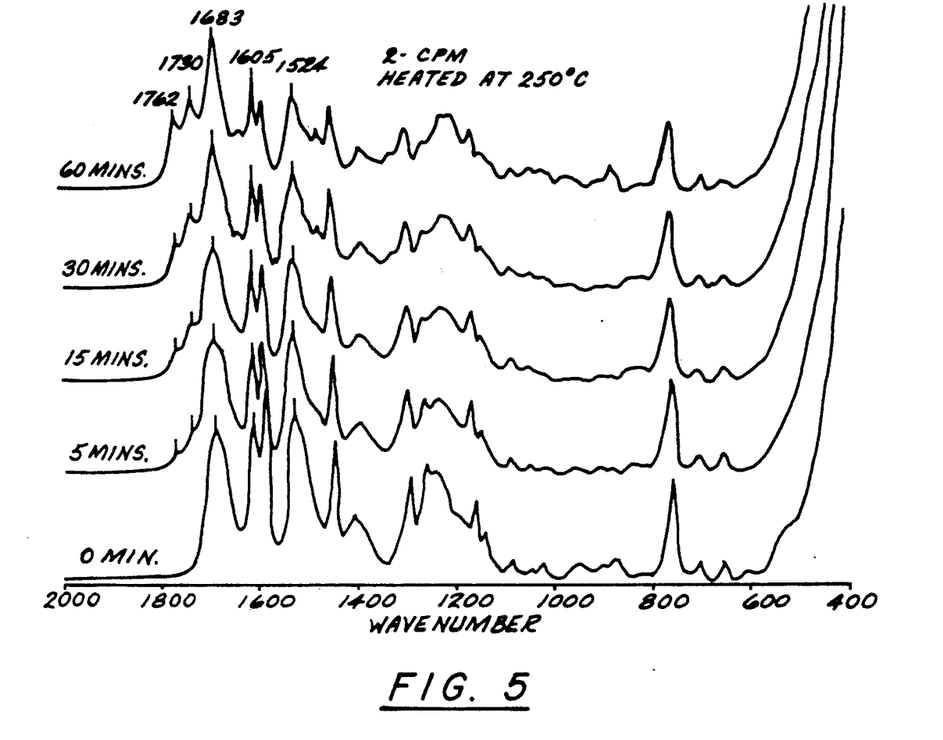
FIG. 5 is an IR spectra of 2-CPM polymer heated at 250° C. for various times.

The IR spectra of the 2-CPM polymer for different times of heating is shown in FIG. 5. In general, the IR spectra for the polymers of Table 3 all demonstrate the same characteristic absorption of imide between 1780–1710 CM$^{-1}$ and the consumption of amide II between 1525–1510 cm$^{-1}$. By comparing the IR spectra of the thermally treated 4-CPM polymer and 4-CPM/MMA copolymer, it seems that there is an additional thermal reaction occurring for 4-CPM/MMA copolymer. The absorption near 1805 cm$^{-1}$ may be the characteristic of an anhydride formed by the thermal reaction between —COOH and —COOH$_3$. The highest percentage of amide reacting during imidization of 2-CPM polymer is approximately 60%. On the contrary, the percentage of amide reacted for 4-CPM polymer is only approximately 40%, which is significantly lower than that of 2-CPM polymer. This large difference may be due to the closer proximity of the amide and acid groups in the 2-CPM polymer. No reaction occurred at the thermally treated polyphenylmethacrylamide model compound.

Figure 6:
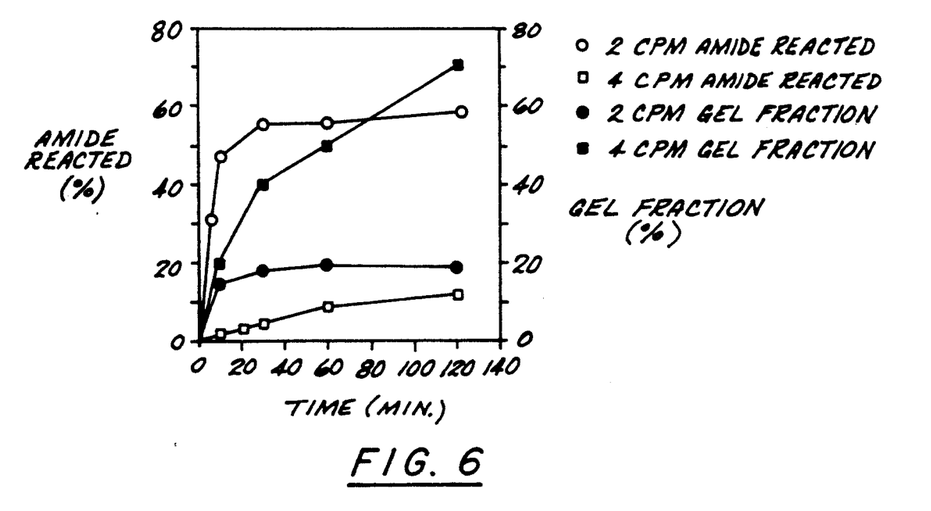
FIG. 6 is a graph depicting percentage of amide reacted and gel fraction vs. heating time at 280° C. for 2-CPM, and 4-CPM homopolymers.

FIG. 6 shows the plots of the amide reacted and gel fraction versus time after heating 2-CPM polymer and 4-CPM polymer at 280° C. From this plot, one notes that it takes a short time to reach the final imide conversion of 2-CPM polymer to the imide. Surprisingly, its gel fraction only goes up to approximate 20%. On the contrary, the gel content of the thermally treated 4-CPM polymer can go up to 60%, while amide consumption is only 20% after 2 hours. It seems clear the imide crosslinking is mostly intermolecular for 2-CPM polymer. Although the imidization of 2-CPM polymer has a lower activation energy and higher imidization yield upon heating, only a small amount of crosslinked network is formed, which contributes a minor increase in the gel fraction and Tg. On the contrary, the imidization of 4-CPM polymer upon heating brings about intermolecular crosslinking and network formation, which increases both the Tg and gel fraction. This reasoning also explains the different results upon repeat heating of the 2-CPM polymer and 4-CPM polymer in the dynamic mechanical analysis and DSC experiments.

The electropolymerized polymer composites of the present invention have many features and advantages, some of which have been discussed above. Two particularly important features include high Tg and the controllable degree of crosslinking. For example, the Tg of 4-carboxyphenyl methacrylamide and 2-carboxyphenyl methacrylamide homopolymers synthesized by electropolymerization in accordance with the present invention is significantly higher (after postcuring) than the published Tg value of the same polymers synthesized by thermally initiated polymerization (300° C. vs. 200° C. for 4-carboxyphenyl methacrylamide and 250° C. vs. 180° C. for 2-carboxyphenyl methacrylamide). The Tg of the 4-CPM/MMA copolymer can reach 270° C. Because of this, it is clear that composites using these polymer matrices will have greater strength at higher temperatures.

A second important feature of this invention arises from the fact that the monomers described herein have condensation-type pendant functional groups (e.g., —COOH, —NH, for 2-carboxyphenylmethacrylamide). Because of this, it is possible to produce a controlled degree of crosslinking which can prevent flow at high temperatures. The system operates such that this reaction occurs during the post-cure or post-fabrication stage of composite processing. As shown by the dynamic mechanical properties which indicate some crosslinking reaction has taken place in the polymer matrix, the Tg and storage modulus within the rubbery plateau region continuously increase after several heating and cooling runs. This behavior results from the curing reaction between the amide and the acid to form the imide. Because of this curing mechanism, the benefits of both the thermosetting and the thermoplastic systems may be obtained by controlling the degree of crosslinking.

In summary, a higher Tg, crosslinking, and reduced flow at high temperatures improve the performance of composites in accordance with this invention relative to the prior art.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process of forming a polymeric matrix prepreg composite consisting essentially the steps of:
    electropolymerizing at least one cyclic N-substituted methacrylamide derivative monomer onto an electrically conductive filler material in a substantially aqueous solution having a monomer concentration and over a time period effective to form a coating of of the polymeric matrix composite prepreg on said filler material, said aqueous solution including at least one organic solvent to define an organic containing aqueous solution, said at least one cyclic N-substituted methacrylamide derivative monomer being moderately soluble in said organic-containing aqueous solution and being permeable to ions diffusing as a result of said electropolymerization step.

2. The process of claim 1 wherein:
    said cyclic N-substituted methacrylamide derivative monomer is aromatic.

3. The process of claim 2 wherein:
    said cyclic N-substituted methacrylamide derivative monomer includes a phenyl group.

4. The process of claim 1 wherein:
    said monomer has the following structure:

where R results in the molecule being a cyclic N-substituted methacrylamide derivative.

5. The process of claim 1 wherein:
    said cyclic N-substituted methacrylamide derivatives selected from the group consisting of phenylmethacrylamide, 2-carboxyphenylmethacrylamide, 4-carboxyphenylmethacrylamide, N-methacryloyl-p-aminophenylacetic acid, N-methacryloyl-3-aminophthalic acid, N-methacryloyl-5-aminophthalic acid, N-methacryloyl-DL-2-phenyl glycine, N-methacryloyl-DL-phenylalanine, N-methacryloyl-DL-3-amino-3-phenyl propionic acid, N-methacryloyl-N-phenyl anthranilic acid, N-methacryloyl-N-phenyl glycine, N-methacryloyl 4-aminosalicylic acid, N-methacryloyl 4-aminosalicylic acid, N-(4-hydroxyphenyl)methacrylamide, N-adamantanyl-methacrylamide, N-phthalimidemethyl-methacrylamide and N-triphenylmethyl methacrylamide.

6. The process of claim 1 wherein:
    said matrix comprises a copolymer having a comonomer comprised of methyl methacrylate and its derivatives.

7. The process of claim 6 wherein:
    said comonomer is at least one of the comonomers selected from the group consisting of cyclohexyl methacrylate, isobornyl methacrylate, methacryloylbenzoic acid, 4-(p-hexyloxybenzoyloxy) phenyl methacrylate and 4-biphenyl methacrylate.

8. The process of claim 1 wherein:
    said polymeric matrix is selected from the group consisting of phenylmethacrylamide/phenylmaleimide copolymer, 2-carboxyphenylmethacrylamide homopolymer, 4-carboxyphenylmethacrylamide homopolymer, 2-carboxyphenylmethacrylamide/methylmethacrylate copolymer and 4-carboxyphenylmethacrylamide/methylmethacrylate copolymer.

9. The process of claim 1 wherein:
said conductive material comprises graphite.

10. The process of claim 9 wherein:
said conductive material comprises at least one bundle of graphite fibers.

11. The process of claim 1 including the step of:
heating said electropolymerized polymeric matrix wherein said polymeric matrix crosslinks.

12. The process of claim 1 including the step of:
cyclically heating and cooling said electropolymerized polymeric matrix to selectively crosslink said polymeric matrix.

* * * * *